United States Patent [19]
Zander

[11] Patent Number: 5,960,222
[45] Date of Patent: Sep. 28, 1999

[54] CAMERA WITH AUTOMATIC FILM INITIALIZATION RESPONSIVE TO FILM LOADING DOOR SENSOR

[75] Inventor: Dennis R. Zander, Penfield, N.Y.

[73] Assignee: Eastman Kodak Company, Rochester, N.Y.

[21] Appl. No.: 09/137,905

[22] Filed: Aug. 20, 1998

[51] Int. Cl.$^6$ ............................................. G03B 1/00
[52] U.S. Cl. ............................................................ 396/408
[58] Field of Search ........................... 396/403, 406–410

[56] References Cited

U.S. PATENT DOCUMENTS

| | | |
|---|---|---|
| 3,481,260 | 12/1969 | Ettischer et al. . |
| 4,281,911 | 8/1981 | Engelsmann et al. . |
| 4,297,019 | 10/1981 | Yagi et al. . |
| 4,311,377 | 1/1982 | Matteson . |
| 4,516,843 | 5/1985 | Ohmura . |
| 4,855,772 | 8/1989 | Hashimoto et al. . |
| 4,860,041 | 8/1989 | Harvey . |
| 4,864,332 | 9/1989 | Harvey . |
| 4,878,075 | 10/1989 | Cannon . |
| 4,952,954 | 8/1990 | Kitazawa . |
| 4,982,212 | 1/1991 | Alyfuku . |
| 5,349,406 | 9/1994 | Johnson . |
| 5,479,226 | 12/1995 | Kazami et al. . |

*Primary Examiner*—Howard B. Blankenship
*Attorney, Agent, or Firm*—Francis H. Boos, Jr.

[57] ABSTRACT

In a low cost camera, film initialization to a first exposure frame by a time constant controlled drive circuit in which the time constant circuit is reset by a door sensor switch as a consequence of unloading and/or loading of film in the camera. This ensures that newly loaded film will be automatically initialized to the first exposure position without requiring the camera user to actuate a shutter release button multiple times to achieve proper initialization. A film advance sensor switch is further employed to prevent subsequent frame advance if film initialization is for any reason not properly achieved.

10 Claims, 3 Drawing Sheets

CAMERA WITH AUTOMATIC FILM INITIALIZATION RESPONSIVE TO FILM LOADING DOOR SENSOR

FIELD OF THE INVENTION

The invention relates generally to the field of photographic cameras, and in particular to cameras with motorized film drives that automatically advance newly loaded film to the frame 1 position.

BACKGROUND OF THE INVENTION

Photographic cameras with motorized film drives are known that will advance newly loaded film to the frame 1 position. High end cameras utilize microprocessor controls that will sense the presence of a cartridge and upon closing of the camera back will initiate the motor drive to advance the film to the first frame position whereupon the motor drive will be terminated. However, the use of microprocessor controls is an expensive proposition and is not suitable for low cost cameras. Low cost motorized cameras are also known that will advance film to the first frame position. These cameras, however, generally require that, after the film cartridge is inserted and the camera back is closed, the motor be activated by pressing the shutter release button.

An example of a prior art film advance motor control circuit of the type just mentioned is shown in FIG. 1. In this control circuit, a timer circuit 10 includes an RC time constant circuit comprising capacitor 12 and resistor 14 coupled between ground and the base of transistor T1. A frame advance timer reset switch S1, ganged with flash initiation switch S6, is moved from contact A to contact B by actuation of the camera shutter release button (not shown) to discharge capacitor 12 for resetting of the timing circuit each time a picture is taken. The emitter of transistor T1 is coupled through film meter sensor switch S2, power on switch S5 and motor wind/rewind switch S7b to the positive terminal of battery 20. The collector of transistor T1 is coupled through resistor divider network 16, 18 to ground. The common terminal 17 of the resistor divider network is coupled to the base of motor drive switching transistor T2. Film drive motor M is coupled between the positive terminal of battery 20 and ground via selectable contacts of wind/rewind switch S7a, S7b, door sensor securement sensor switch S3 and film present sensor switch S4. Door sensor securement sensor switch S3 is closed when the camera back is closed in a light tight position. Switch S4 is closed in response to a sensor at the film gate which senses the presence or absence of film in the film gate. Film meter switch S2 is normally set to contact A which is the motor brake position. It is mechanically engaged with the camera's shutter release button (not shown) such that when the shutter button is released at the end the picture taking cycle, the switch moves to position B to provide power to the motor drive circuit including the timing circuit 10 and motor drive switch transistor T2. Power switch S5 includes a momentary RESET contact which resets a timing circuit in the flash charger portion of flash circuit 22 to begin flash charging as the power switch S5 is moved to the ON contact position. In operation, when film is loaded into the camera and the camera back (door) is secured in the closed position, switches S3 and S4 are closed to complete the circuit to film advance motor M. The motor is not actuated, however, since meter switch S2 is set to the brake contact A and no power is applied to the motor drive timing circuit. To initialize the film to the initial exposure position, usually two or three frames from the beginning of the film strip, it is necessary to actuate the shutter release button for the number of times needed to advance the film the requisite number of frames. When the shutter release button is pressed, timing reset switch S1 is moved to contact B to discharge capacitor 12 thereby resetting the RC timing circuit 12, 14 When the shutter release button is released by the operator, Switch S1 reverts to contact A applying a ground potential to the base of transistor T1 and meter switch S2 moves to contact B applying a positive battery voltage to the emitter of transistor T1 thereby biasing the transistor into conduction. The resultant positive potential at terminal 17 biases motor drive switching transistor into conduction thereby turning motor M on with the switches S7a, S7b set in the motor wind (film advance) direction. When the metering mechanism in the camera senses that the film has moved a distance of one frame, meter switch S2 returns to the motor brake contact A stopping the motor and film advance. If for any reason, the film does not advance, the meter mechanism does not operate to reset the meter switch S2 and the motor continues to run until the charging of timing circuit capacitor 12 causes the base emitter bias of transistor T1 to decrease to the point at which transistor T1 stops conduction. This, in turn, opens motor drive switching transistor T2, thereby stopping the motor M.

The problem with a camera that operates in this manner for film initialization is that, if a consumer loads film in the camera but for some reason the film is not transported to the take-up reel and is not advanced with each press of the shutter release, the motor nonetheless operates in a somewhat normal sounding manner and the camera user thinks that images are being captured but, in fact, they are not. An additional problem is that camera users do not always remember to actuate the shutter release button to advance the film to frame 1 before exposing their first image but rather start taking pictures as soon as film has been loaded. The result is that they may lose several images which they think have been captured. There is a need, therefore, for a low cost film initialization arrangement that will automatically advance the film to the first frame position when a camera back is closed and/or locked without requiring further action by the consumer such as actuating the shutter release button.

SUMMARY OF THE INVENTION

In accordance with an aspect of the invention, therefore, there is provided a method of initializing film loading in a camera in response to securement of a film loading door in a light tight position, the camera having a motor drive circuit comprising a resistor-capacitor time constant circuit. The method comprises providing a switch in circuit with the time constant circuit, the switch having first and second contact positions. The method further includes placing the switch in a first contact position to complete the time constant circuit in response to securement of the door in a light tight position and placing the switch in a second contact position to discharge the capacitor in response to unsecurement of the door from the light tight position to allow removal and reloading of film in the camera. In this manner, the time constant circuit is reset to an initial condition to allow operation of the motor drive circuit for a sufficient time determined by the time constant circuit to ensure advancing of the film to a first exposure frame position in response to securement of the door in a light tight position after loading of film into the camera. Once the film is properly initialized, an additional switch in the timing circuit is actuated in response to each picture taking operation to reset the timing circuit to allow film advance, frame by frame, for each subsequent picture taking operation.

In accordance with another aspect of the invention, there is provided film initialization apparatus for a motor drive camera, the camera having a film drive motor, a motor drive circuit, a film loading door and a sensor switch indicating when the door is secured in a light tight position. The apparatus comprises a timer circuit coupled to the motor drive circuit, the timer circuit including a resistor-capacitor time constant circuit. A switch is provided in circuit with the time constant circuit. The door sensor switch has first and second contacts and is set to the first contact to complete the time constant circuit in response to securement of the film loading door in a light tight position and is set to the second contact to discharge the capacitor in response to unsecurement of the door from the light tight position. With this arrangement, the time constant circuit is reset by discharge of the capacitor to an initial condition to allow operation of the motor drive circuit for a sufficient time determined by the time constant circuit to ensure advancing of the film to an initial exposure position in response to securement of the door in a light tight position after loading of film into the camera.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 2:
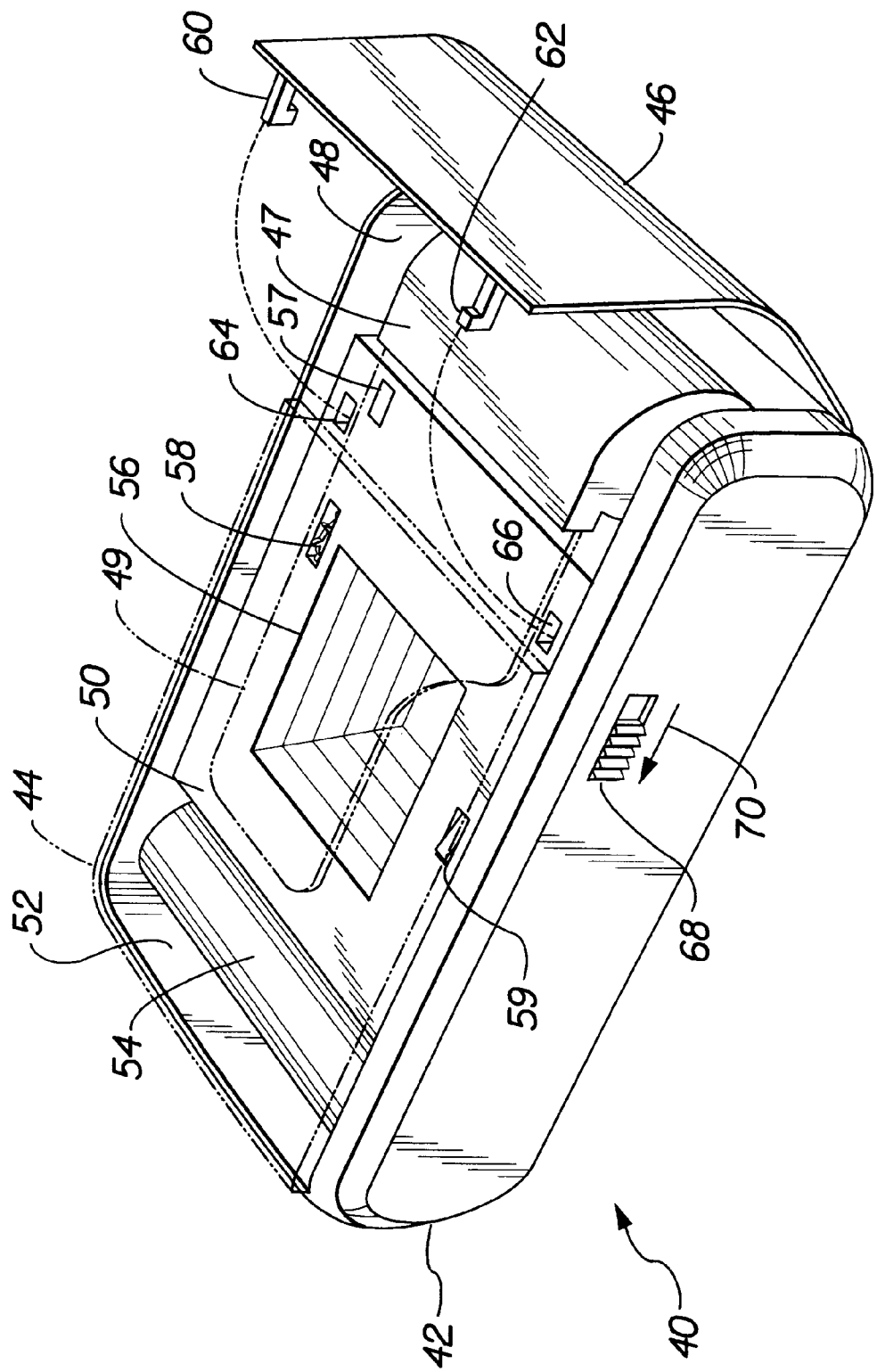
FIG. 2 is a perspective illustration of a camera showing an easy load film loading structure and embodying the film initialization motor drive circuit of the invention.

Referring to FIG. 2, there is shown a camera 40 having a main body portion 42 and a fixed back 44 (shown in dotted outline) permanently covering about three-fourths of the back of the camera. A film loading door 46 is hingedly mounted at one end of the camera. The camera body portion 42 is provided with a film cartridge chamber 48 and a film path 50 leading to a film takeup chamber 52 having a rotatable film takeup spool 54. A film cartridge 47 is shown positioned in the cartridge chamber 48 with the film leader 49 (shown in line-dot outline) extending partially into the film path 50 formed between the fixed back 44 and main body portion 42. This is the typical position of the film as it would be inserted by a camera user during the film loading process just prior to closing the film door 46. A frame exposure gate 56 in film path 50 defines the frame exposure areas on the film. A film drive sprocket 58, actuated by a film drive motor (not shown), engages perforations along the edge of the film to advance the film forward in the "wind" direction during the film loading and frame-by-frame picture-taking sequence and to drive the film in the reverse direction ("rewind") to return the film to the cartridge once the film is fully exposed. A mechanical film sensor 57 is provided in the film path 50 adjacent the cartridge chamber 48 and serves to close a "film present" sensor switch S4 (FIG. 3) whenever film is present in the film path. One end of a pivoted lever 59 is located adjacent the frame exposure gate 58. This is an area of the film path 50 that corresponds to the narrowed portion of the film leader when the film is initially loaded into the film path by the user just prior to closing the door 46. Lever 59 actuates a "film initialized" sensor switch S10 (FIG. 3) to close the switch when the film is advanced toward the initial frame exposure position. Film loading door 46 is provided with a pair of hooks 60 and 62 which are positioned to enter apertures 64 and 66, respectively, when the door is closed to engage a pivotable latching bar (not shown) to hold the door securely in a closed, light tight position. A manually operated latch member 68 is operable by the camera user in the direction of arrow 70 to unlock the door 46 to allow it to be opened for access to the film cartridge. Lever 59 is preferably also coupled to the latching bar to prevent unlocking of the door when film is advanced into contact with the lever 59. Internally of the camera body 42, a two position door securement sensor switch, S3' (FIG. 3) is coupled to the manually operated latch member 68 in such a manner as to be normally set in one contact position indicative of a door closed (and locked) position and to be moved by actuation of the latch member 68 to be set in another contact position indicative of an unsecured or open door position. The function of this switch in connection with film initialization operation is described more fully below.

Figure 1:
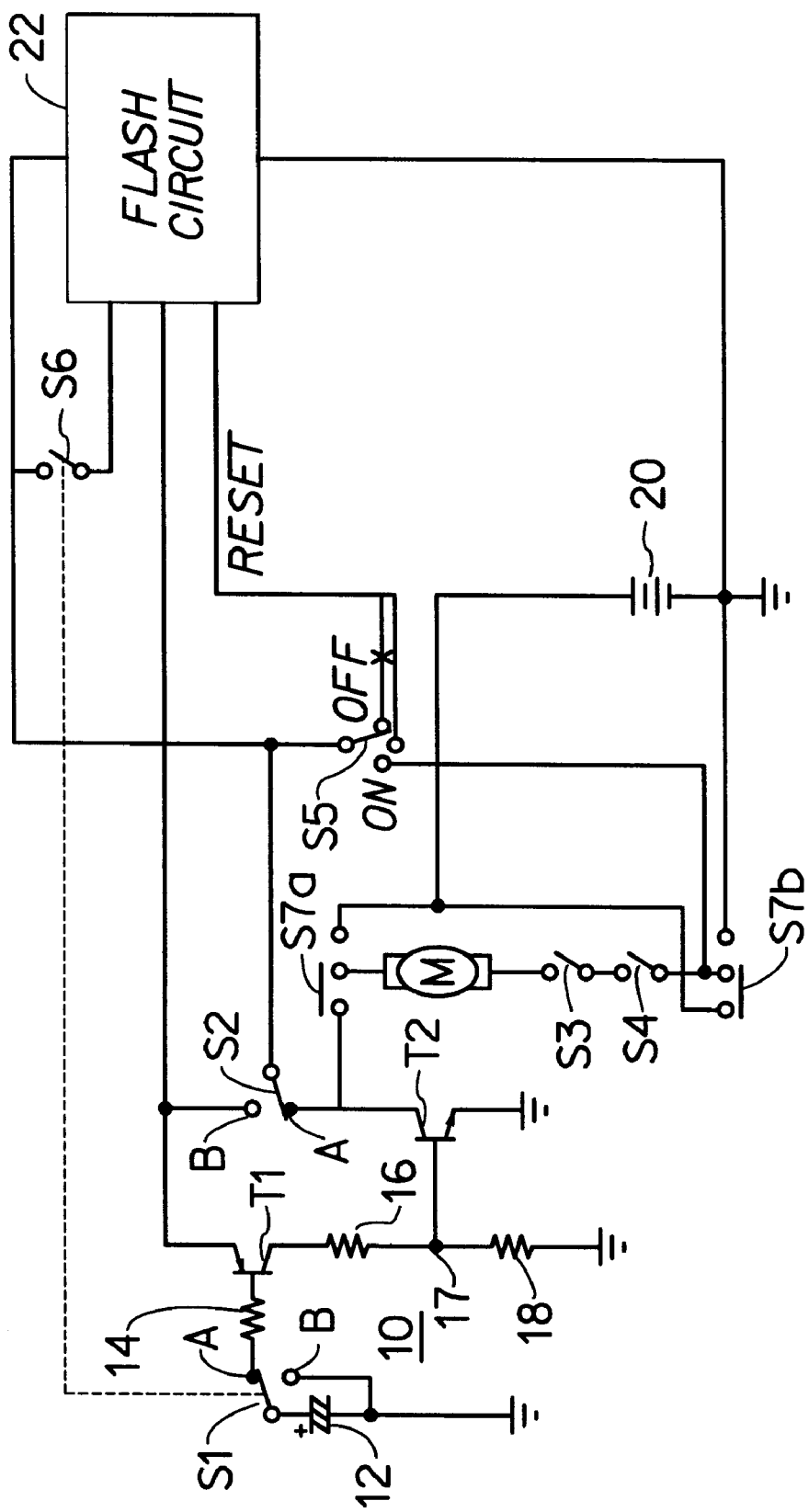
FIG. 1 is a schematic of a prior art motor drive circuit for advancing film in a camera.
Figure 3:
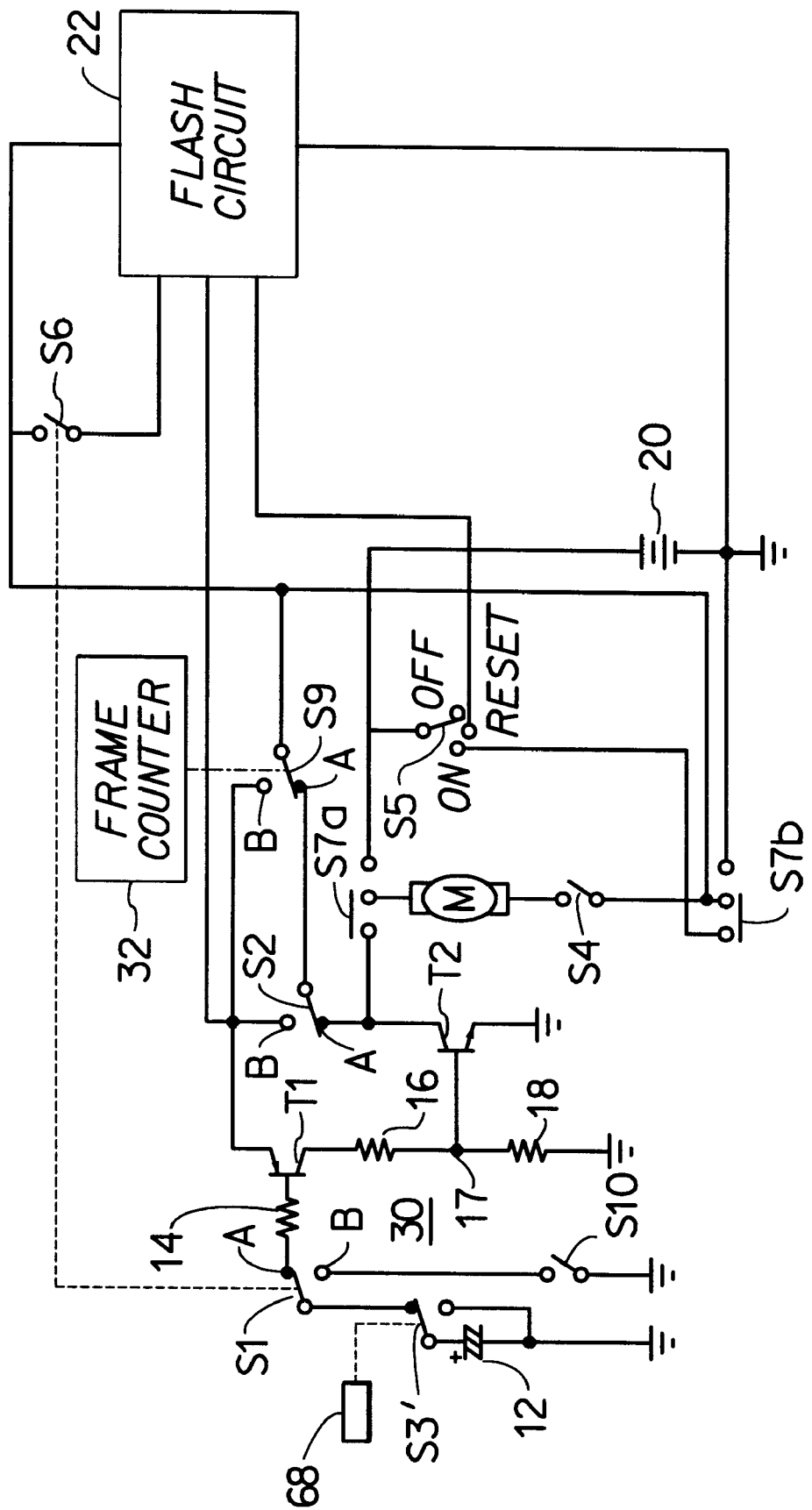
FIG. 3 is a schematic of a film initialization motor drive circuit for advancing film in a camera in accordance with the present invention.

Turning now to FIG. 3, there is shown an improved film initialization motor drive circuit and method in accordance with the present invention. Portions of the circuit of FIG. 3 are the same as the circuit of FIG. 1 and, consequently, corresponding elements carry the same reference numerals. An important difference between the two circuits is that, in the circuit of FIG. 3, the single position door securement sensor switch S3 of FIG. 1 is removed from the motor circuit and a similar sensing function is provided by a two position door securement sensor switch S3' coupled in the RC time constant circuit of the modified timing circuit 30. Sensor S3' has a normal contact A at which the switch is set when the camera door is closed securely in a light tight position and has a back contact B at which the switch is set when the door is unsecured, that is unlocked and/or opened as a consequence of user actuation of the latch member 68. Setting the door switch S3' to contact B causes the capacitor 12 to be discharged thereby resetting the timer circuit 30 as part of the film unloading and/or loading process. While switch S3' may be set to contact B merely by sensing opening of the film loading door, it is preferred that the switch be interlocked with the latching mechanism which locks the door in the closed position and that movement of the door sensor switch S3' to contact B occur in response to the actuation of the latch member 68 to unlock the door, i.e., unsecuring the door from its light tight position. More importantly, making the door sensor switch responsive to the latching mechanism assures that the door is firmly secured in the closed position before the timer circuit (and consequent film initialization) is allowed to commence.

The benefit and advantage of locating the two position door securement sensor switch S3' in the time constant circuit is that, in operation, when the door is opened to unload and/or load film in the camera, the motor drive timing circuit is reset by discharging capacitor 12 through back contact B to ground thereby removing any residual charge existing on the capacitor at the end of the motor rewind process. Then, when the door is closed, and preferably latched as mentioned above, the film is automatically initialized by advancing the film to its first exposure position. Moreover, by discharging capacitor 12, timer circuit 30 is assured of operating for the full time period required for the time constant circuit 12, 14 to raise the voltage on the base of timer transistor from ground to the level necessary to bias the transistor to cutoff thereby assuring operation of the motor for the necessary time to advance the film to the initial exposure position. It should be noted that frame advance timer reset switch S1 is normally set at contact A during film initialization since it is opened only as a consequence of actuation of the shutter release button. The film initialization motor drive circuit of FIG. 3 therefore causes actuation of the motor M as consequence of closing and/or latching of the door thereby automatically initializing the film to the initial frame exposure position without further action by the camera user. In this regard, since meter switch S2 opens and closes at each frame position, a bypass power supply switch S9 is provided in the circuit of FIG. 3 to be responsive to a conventional frame counter mechanism (not shown) in the camera to provide power to the timer circuit 30 during the film initialization operation. Switch S9, which normally is set to contact A, is set to contact B when the frame counter is less than a frame count corresponding to the initial exposure position on the film strip, e.g. less than a count of 3. In this manner, when the frame counter reaches the count of 3, bypass switch S9 reverts to contact A thus braking motor M and stopping the film initialization.

In a further improvement of the timer circuit 30, a film initialized sensor switch S10, actuated by lever 59 (FIG. 2) is coupled between the back contact B of frame advance switch S1 and ground. Once the film is properly advanced as a result of the film initialization operation, switch 10 is closed by lever 59 by virtue of the film edge passing over the lever. Closure of switch S10 provides a ground connection to contact B of film advance timer reset switch S1. Thus, switch S1 is enabled to continue its function as a timer circuit reset switch for frame-to-frame film advance as described in connection with the circuit of FIG. 1. Additionally, switch S1 now has the added advantage that it also functions in response to an open condition of switch S10, which would be caused by failure of the film to properly advance during the film initialization, to prevent subsequent operation of the film advance motor thereby providing an indication to the camera user that a problem with film initialization has occurred. This allows the user to take the necessary corrective action without the wastage of film.

The invention has been described in detail with particular reference to certain preferred embodiments thereof, but it will be understood that variations and modifications can be effected within the spirit and scope of the invention.

What is claimed is:

1. A method of initializing film loading in a camera in response to securement of a film loading door in a light tight position, the camera having a motor drive circuit comprising a resistor-capacitor time constant circuit, the method comprising:

providing a switch in circuit with said time constant circuit, said switch having first and second contact positions;

placing said switch in said first contact position to enable said time constant circuit in response to securement of said door in a light tight position; and placing said switch in said second contact position to discharge said capacitor in response to unsecurement of said door from said light tight position to allow removal and reloading of film in the camera;

whereby said time constant circuit is reset to an initial condition to allow operation of said motor drive circuit for a sufficient time determined by said time constant circuit to ensure advancing of said film to a first exposure frame position in response to securement of said door in a light tight position after loading of film into the camera.

2. The method of claim 1 wherein said switch is placed in said second contact position in response to opening of said door.

3. The method of claim 1 wherein said switch is placed in said second contact position in response to actuation of a locking device for said door.

4. The method of claim 1 wherein said switch is placed in said first contact position in response to closing of said door.

5. The method of claim 1 wherein said switch is placed in said first contact position in response to actuation of a lock device for said door.

6. Film initialization apparatus for a motor drive camera, the camera having a film drive motor, a motor drive circuit and a film loading door adapted to be closed in a light tight position after loading of film into the camera, the apparatus comprising:

a timer circuit coupled to said motor drive circuit, said timer circuit including a resistor-capacitor time constant circuit; and a film loading door securement sensor switch in circuit with said time constant circuit, said door securement sensor switch having first and second contacts and being set to said first contact to complete said time constant circuit in response to securement of said door in a light tight position and to said second contact to discharge said capacitor in response to unsecurement of said film loading door from said light tight position;

whereby said time constant circuit is reset by discharge of said capacitor to an initial condition to allow operation of said motor drive circuit for a sufficient time determined by said time constant circuit to ensure advancing of said film to an initial exposure position in response to securement of said film loading door in a light tight position after loading of film into the camera.

7. The apparatus of claim 6 further comprising;

a power source; and a film initialization position sensor including a frame counter and a power supply switch coupled from said power source to said timer circuit, the power supply switch having a first contact position which supplies power to said timer circuit to actuate said motor drive circuit to advance said film to said first exposure position and a second contact responsive to said frame counter to interrupt power supply to said timer circuit to terminate operation of said motor drive circuit when said film reaches said first exposure position;

whereby said film initialization position sensor is effective to terminate said motor drive circuit when film is advanced to said first position in normal manner, and said timer circuit is effective to terminate said motor drive circuit when said film fails to reach said initial exposure position within a time set by said time constant circuit starting from a reset condition established by discharge of said capacitor by said door securement sensor switch.

8. The apparatus of claim 6 further comprising:

a film sensor switch which is closed in response to sensing of normal advance of said film to said first exposure position; and a frame advance switch coupled in circuit with said time constant circuit, said frame advance switch having a first contact set to complete said time constant circuit at the completion of a photographic exposure cycle so as to advance said film to a next successive frame exposure position and having a second contact to which said frame advance switch is set in response to initiation of an exposure cycle to couple said film sensor switch across said capacitor;

whereby said timer circuit is reset by discharge of said capacitor through said film sensor switch to allow said timer to actuate said motor drive circuit to advance said film to said next exposure position only if said film has been properly advanced to said first exposure position during film initialization as indicated by closure of said film sensor switch.

9. The apparatus of claim 6 wherein said door securement sensor switch is responsive to closing of the film loading door to be set to said first contact.

10. The apparatus of claim 6 wherein said camera also includes a door latch device for locking the film loading door in the closed, light tight position, wherein said film loading door securement switch is responsive to said latch device upon locking of the film loading door in the light tight position to be set to said first contact.

* * * * *